(12) United States Patent
Chiang et al.

(10) Patent No.: US 7,278,224 B2
(45) Date of Patent: Oct. 9, 2007

(54) PORTABLE ELECTRONIC DEVICE

(75) Inventors: Tung-Yi Chiang, Houli Township, Taichung County (TW); Po-Fu Wu, Kaohsiung (TW); Chao-Ho Wang, Jhonghe (TW)

(73) Assignee: BenQ Corporation, Taoyuan Shien (TW)

( * ) Notice: Subject to any disclaimer, the term of this patent is extended or adjusted under 35 U.S.C. 154(b) by 0 days.

(21) Appl. No.: 11/438,371

(22) Filed: May 23, 2006

(65) Prior Publication Data

US 2006/0267791 A1 Nov. 30, 2006

(30) Foreign Application Priority Data

May 24, 2005 (TW) .............................. 94116979 A

(51) Int. Cl.
*G01B 3/12* (2006.01)
*H04M 1/21* (2006.01)

(52) U.S. Cl. ...................... 33/755; 455/556.1; 455/344

(58) Field of Classification Search .................. 33/772, 33/773, 775, 779, 780, 781, 782; 455/550.1, 455/556.1, 575.1, 575.3, 575.4, 90.1, 344, 455/347, 414.1
See application file for complete search history.

(56) References Cited

U.S. PATENT DOCUMENTS

2002/0065104 A1* 5/2002 Hess et al. .................. 455/557
2003/0145480 A1* 8/2003 Endo ............................ 33/760
2004/0041798 A1* 3/2004 Kim ............................ 345/179
2006/0170785 A1* 8/2006 Mashitani et al. ...... 348/211.99
2007/0085993 A1* 4/2007 Brown, Jr. .................... 356/3

FOREIGN PATENT DOCUMENTS

JP  2006314018 A  * 11/2006
KR  2005122982 A  * 12/2005

* cited by examiner

*Primary Examiner*—R. Alexander Smith
(74) *Attorney, Agent, or Firm*—Rabin & Berdo, PC

(57) ABSTRACT

A portable electronic device is provided. The portable electronic device includes a casing, a display unit, a roller, an encoder and a controller. The casing has a casing surface. The display unit is disposed on the casing surface. The roller is rotatably disposed on the casing surface with a portion of the roller being exposed outside the casing. The roller is for adjusting the voice of the portable electronic device when the portable electronic device works at a voice-adjusting mode. The roller is for touching a surface and rotating on the surface to measure a length when the portable electronic device works at a length-measuring mode. The encoder disposed inside the casing is for outputting a pulse number. The controller receives the pulse number and determines a length value accordingly, and then controls the display unit to display the length value.

19 Claims, 6 Drawing Sheets

PORTABLE ELECTRONIC DEVICE

This application claims the benefit of Taiwan application Serial No. 94116979, filed May 24, 2005, the subject matter of which is incorporated herein by reference.

BACKGROUND OF THE INVENTION

1. Field of the Invention

The invention relates in general to a portable electronic device, and more particularly to a portable electronic device measuring the length by rotating a roller.

2. Description of the Related Art

Living in today's society where science and technology advance rapidly, portable electronic devices have become indispensable to modern people in their everyday life. The mobile phone in particularity, with the features of slimness, light weight and portability, conveniently enables people to be connected whenever and wherever desired.

A conventional mobile phone at least includes a casing, a speaker and a volume dial. The speaker and the volume dial are both disposed on the surface of the casing. The speaker is for sending voices, and the volume dial is for a user to adjust the voice of the speaker.

However, when the user would like to measure the length of an object or a surface, the user might find it inconvenient if the user does not have a ruler or measuring tape at hand. Unfortunately, those who have a mobile phone at hand may not always bring a ruler or a measuring tape with them.

SUMMARY OF THE INVENTION

It is therefore an object of the invention to provide a portable electronic device. With the design of measuring a length that a roller rotates over a to-be-measured object or plane, the portable electronic device displays a length value on a display unit according to the rotation turn of the roller. Thus, not only is the user allowed to measure the length of an object or a plane whenever and wherever needed, the practicality of portable electronic device is also largely enhanced.

The invention achieves the above-identified object by providing a portable electronic device selectively working at a voice-adjusting mode and a length-measuring mode. The portable electronic device includes a casing, a display unit, a roller, an encoder and a controller. The casing has a casing surface. The display unit is disposed on the casing surface. The roller is rotatably disposed on the casing surface with a portion of the roller being exposed outside the casing. The roller is for adjusting the voice of the portable electronic device when the portable electronic device works at the voice-adjusting mode. The roller is for touching a surface and then rotating on the surface to measure a length when the portable electronic device works at the length-measuring mode. The encoder disposed inside the casing is for outputting a pulse number according to the rotation turn of the roller when the portable electronic device moves with respect to the surface. The controller disposed inside the casing is electrically connected to the display unit and the encoder. The controller controls the portable electronic device to selectively work at the voice-adjusting mode and the length-measuring mode. The controller receives the pulse number and then determines a length value accordingly. Besides, the controller controls the display unit to display the length value.

The invention achieves the above-identified object by providing another portable electronic device selectively working at a voice-adjusting mode and a length-measuring mode. The portable electronic device includes a casing, a display unit, a roller, an encoder and a controller. The casing has a casing surface. The display unit is disposed on the casing surface. The roller is rotatably disposed on the casing surface with a portion of the roller being exposed outside the casing. The roller is selectively positioned at a first position and a second position with respect to the casing. When the roller is positioned at the first position, the roller works at the voice-adjusting mode for adjusting the voice of the portable electronic device. When the roller is positioned at the second position, the roller works at the length-measuring mode is for touching the surface and then rotating on the surface to measure a length. The display unit to display a length value of the length.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
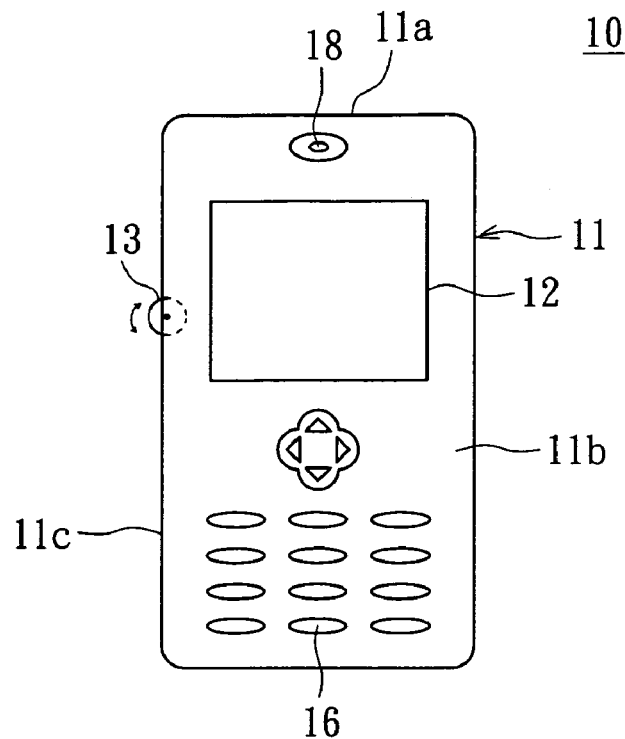
FIG. 1 is a diagram of a portable electronic device according to a first embodiment of the invention.
Figure 2:
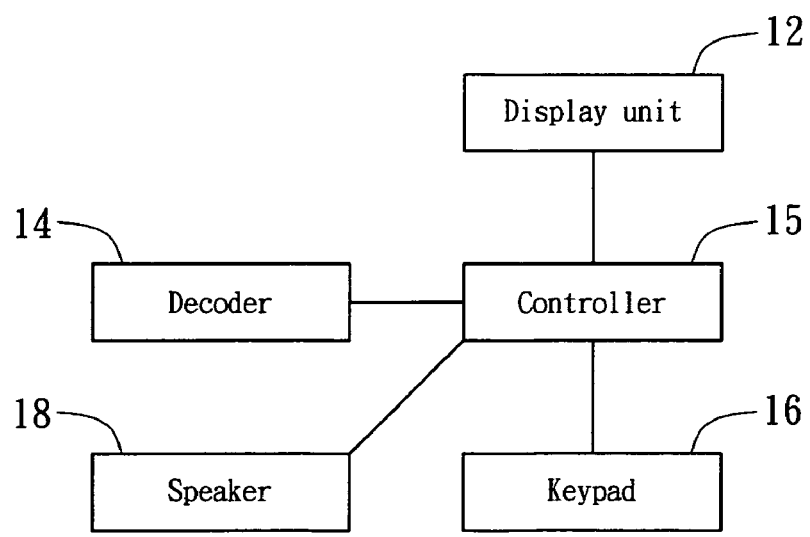
FIG. 2 is a circuit block diagram of a portable electronic device according to a first embodiment of the invention.

Referring to FIGS. 1~2, FIG. 1 is a diagram of a portable electronic device according to a first embodiment of the invention, and FIG. 2 is a circuit block diagram of the portable electronic device according to the first embodiment of the invention. In FIGS. 1~2, the portable electronic device 10 selectively works at a voice-adjusting mode and a length-measuring mode for a user to selectively adjust the voice of the portable electronic device 10 and measure a length on a surface. The portable electronic device 10 includes a casing 11, a display unit 12, a roller 13, an encoder 14 and a controller 15. The casing 11 has a casing surface 11a. The display unit 12 is disposed on the casing surface 11a for displaying a screen frame. The roller 13 is rotatably disposed on the casing surface 11a with a portion of the roller 13 being exposed outside the casing 11. When the portable electronic device 10 works at the voice-adjusting mode, the roller 13 is for the user to adjust the voice of the portable electronic device 10. When the portable electronic device 10 works at the length-measuring mode, the roller 13 is for touching a surface and then rotating on the surface to measure a length on the surface.

The encoder 14 disposed inside the casing 11 is for outputting a pulse number according to rotation of the roller 13 when the portable electronic device 10 moves with respect to the surface in contact. Given that the rotation turn of the roller 13 is proportional to the length and that the pulse number outputted by the roller 13 is proportional to the rotation turn of the roller 13, the length is proportional to the pulse number outputted by the roller 13. The controller 15 is disposed inside the casing 11 and is electrically connected to the display unit 12 and the encoder 14. The controller 15 controls the portable electronic device 10 to selectively work at the voice-adjusting mode and the length-measuring mode. The controller 15 receives the pulse number and then determines a length value accordingly. Besides, the controller 15 controls the display unit 12 to display the length value from which the user knows the value of the length.

In the present embodiment, the casing surface 11a has a casing front surface 11b and a casing lateral surface 11c. The roller 13 can be disposed on the casing lateral surface 11c with a portion of the structure being exposed outside the casing lateral surface 11c. The display unit 12 is disposed on the casing front surface 11b. Besides, the portable electronic device 10 further includes a keypad 16 disposed on the casing surface 11a. For example, the keypad 16 can be disposed on the casing front surface 11b with the display unit 12 to be electrically connected to the controller 15. The keypad 16 includes several number keys, several function keys and a navigation key for the user to input and operate with. The portable electronic device 10 further includes a speaker 18 disposed on the casing surface 11a. For example, the speaker 18 can be disposed on the casing front surface 11b with the display unit 12 to be electrically connected to the controller 15. When the portable electronic device 10 is at the voice-adjusting mode, the speaker 18 is for sending voice. The user can rotate the roller 13 to adjust the voice of the speaker 18.

As for the switching mechanism with regard to how the roller 13 alternates between adjusting the voice of the portable electronic device 10 and measuring the length is disclosed below.

The roller 13 is selectively positioned at a first position and a second position with respect to the casing 11 for the user to adjust the voice of the portable electronic device 10 and measure the length.

As shown in FIG. 1, when the roller 13 is positioned at the first position, most of the structure of the roller 13 is exposed outside the casing 11 in a natural state. Meanwhile, the roller 13 works at the voice-adjusting mode. That is, when the portable electronic device 10 works at the voice-adjusting mode, the user can adjust the voice of the portable electronic device 10, the voice of the speaker 18 for instance, by rotating the roller 13.

Figure 3:
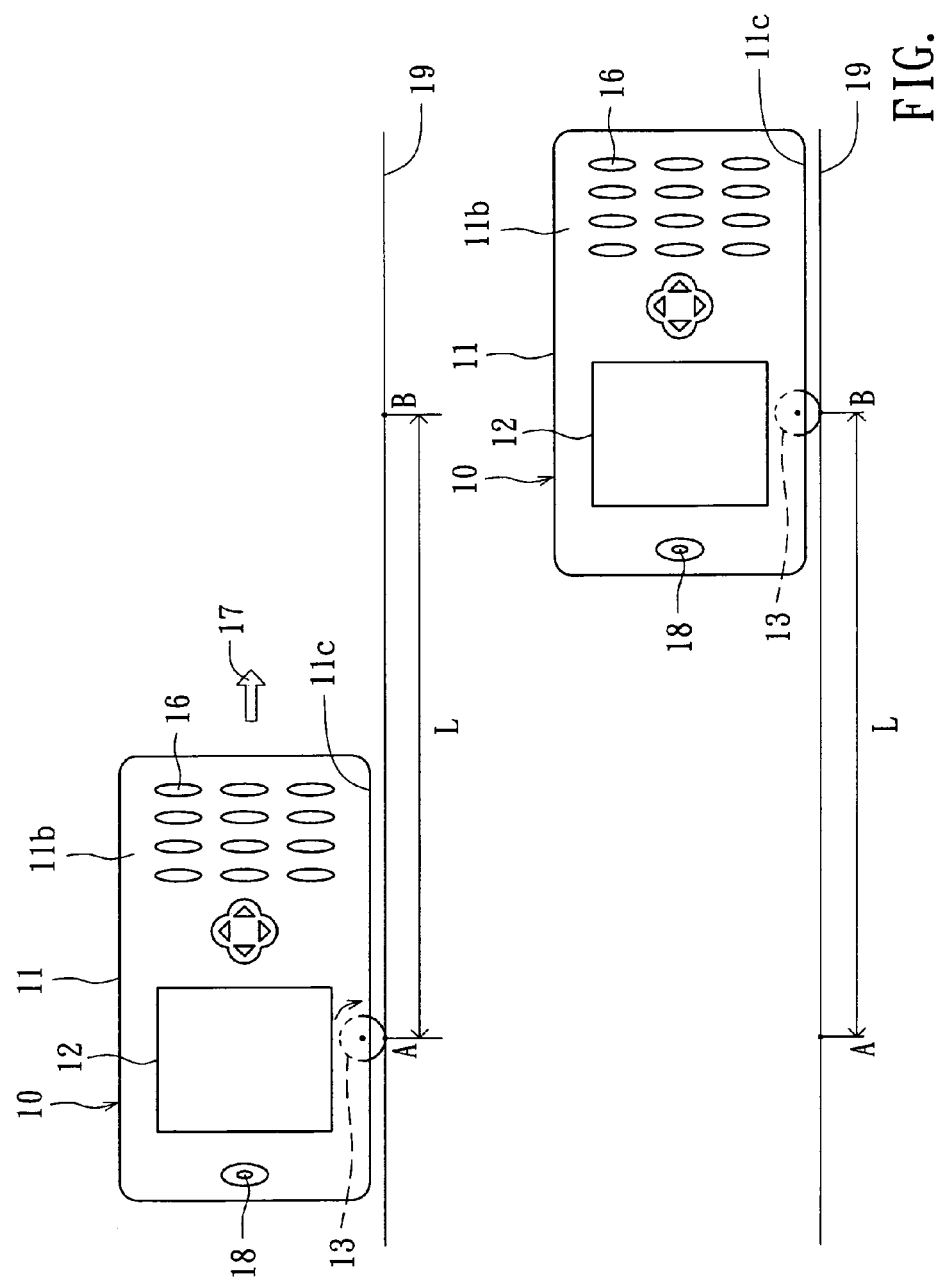
FIG. 3 is a flowchart showing the continuous movement a roller in FIG. 1 rolling from point A to point B when at a second position.

As shown in FIG. 3, when the user press the roller 13 to touch a surface 19 with the casing lateral surface 11c facing the surface 19, the roller 13 is pressed and slightly moves towards the inside of the casing 11, and the portion of the structure of the roller 13 exposed outside the casing 11 is smaller than that exposed in the natural state.

When the roller 13 is moved from the first position to the second position, the encoder 14 or the position sensing unit (unshown) triggers a first signal. The controller 15 receives the first signal and switches the portable electronic device 10 to the length-measuring mode from the voice-adjusting mode. Meanwhile, the roller 13 works at the length-measuring mode. That is, when the portable electronic device 10 works at the length-measuring mode, the user can rotate the roller 13 on the surface 19 along the direction of the arrow 17 to measure the length L contained between a point A and a point B. For example, the user moves the portable electronic device 10 for the roller 13 to rotate to the point B from the point A. After the user has measured the length L, the user can stop rotating the roller 13, and separate the roller 13 from the surface 19. Meanwhile, the encoder 14 outputs a pulse number according to the rotation turn of the roller 13 corresponding to the length L that the portable electronic device 10 moves with respect to the surface 19 in contact. The controller 15 receives the pulse number and then determines a length value accordingly. The controller 15 controls the display unit 12 to display the length L contained between the point A and the point B.

Despite the present embodiment is exemplified by the roller 13 rotating clock-wisely to the point B from the point A, the roller 13 can rotate anti-clock-wisely to the point A from the point B. The corresponding pulse number can also be outputted to achieve the object of measuring the length L.

Figure 4:
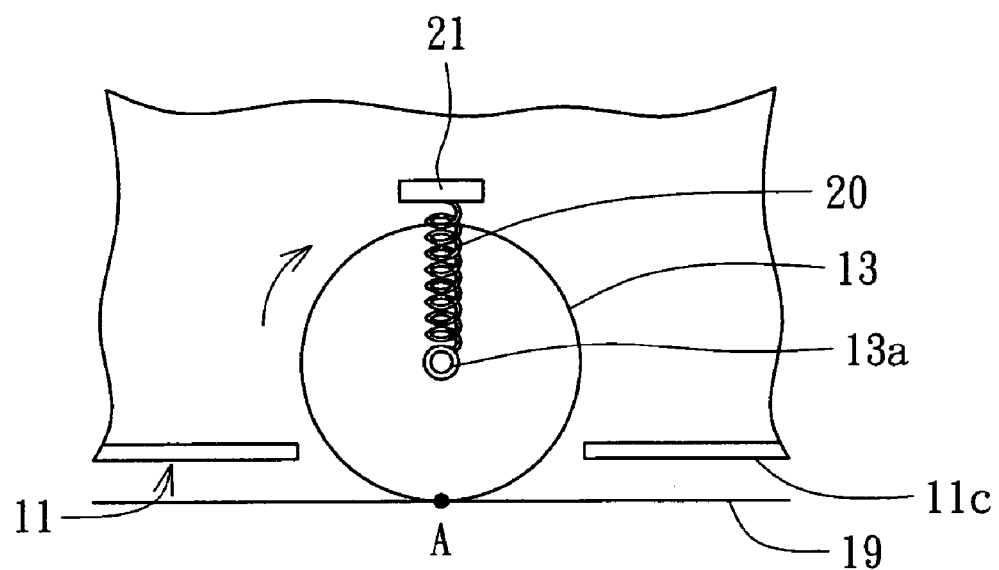
FIG. 4 is a partial enlarged diagram a roller in FIG. 3 compressing an elastomer when at a second position.
Figure 5:
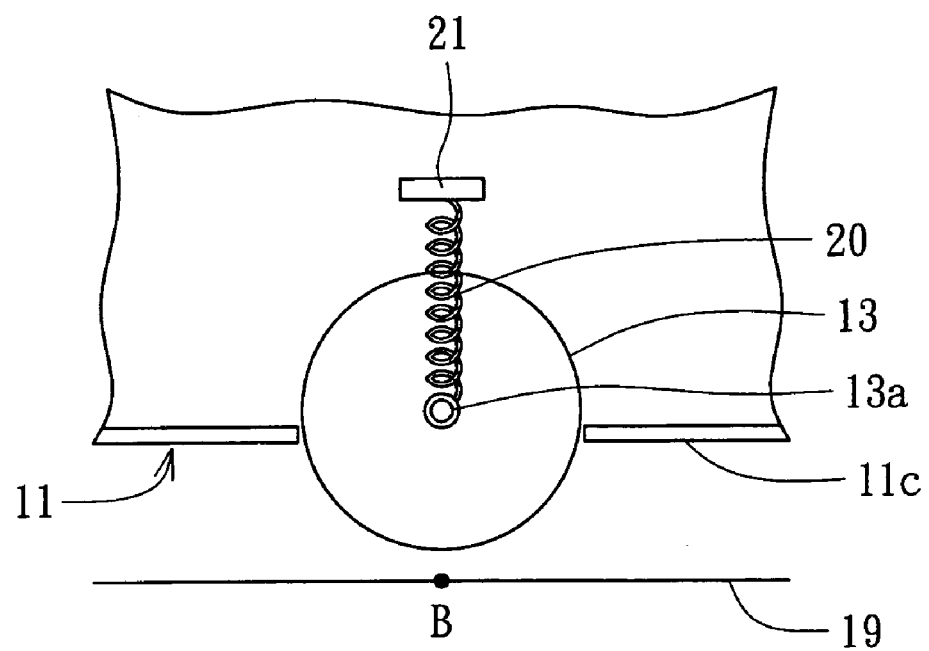
FIG. 5 is a diagram showing an elastomer in FIG. 4 enabling a roller to return to a first position.

As shown in FIG. 4~5, for the roller 13 to restore to the first position in the natural state from the second position after the user has measured the length L, the portable electronic device 10 further includes an elastomer 20 connected to the roller 13. The elastomer 20 can be a spring, an elastic piece, or any combination of the spring and the elastic piece. The elastomer 20 is exemplified by a spring structure here. In the present embodiment, the elastomer 20 connects a rotating shaft 13a projected from the spindle of the roller 13 and a fixing piece 21 disposed inside the casing 11. As shown in FIG. 4, when the roller 13 is pressed to touch the surface 19, the roller 13 is positioned at second position, and the elastomer 20 is compressed.

As shown in FIG. 5, when the roller 13 leaves surface 19, the elastic force of the elastomer 20 forces on the roller 13 from the second position to the first position, and the roller 13 is restored to be in the natural state. Meanwhile, the encoder 14 or the position sensing unit triggers a second signal. The controller 15 receives the second signal and then switches the portable electronic device 10 to the voice-adjusting mode from the length-measuring mode. However, the method for the elastomer 20 to connect the roller 13 is not limited thereto. For example, when the elastomer 20 can connect the rotating shaft 13a and the casing 11, the roller 13 is moved to the first position from the second position when leaving the surface 19.

As for how the controller 15 determines the length value according to the received pulse number is disclosed below. For example, the controller 15, which stores the value of the radius of the roller 13 and the basic pulse number generated by the roller 13 during each rotation, determines the length value according to the pulse number, the radius of the roller 13 and the basic pulse number generated by the roller 13 during each rotation. When the pulse number, the radius of the roller 13 and the basic pulse number generated by the roller 13 during each rotation which are outputted by decoder 14 and the length value determined by the controller 15 are respectively equal to K, R, M and D, D is substantially equal to the value of $2\pi RM/K$. The decoder 14 can count an uncompleted rotation of roller 13 as equivalent to one rotation or totally neglect it. Selectively, the decoder 14 can count a half-and-over but uncompleted rotation of roller 13 as equivalent to one rotation or totally neglect it.

Figure 6:
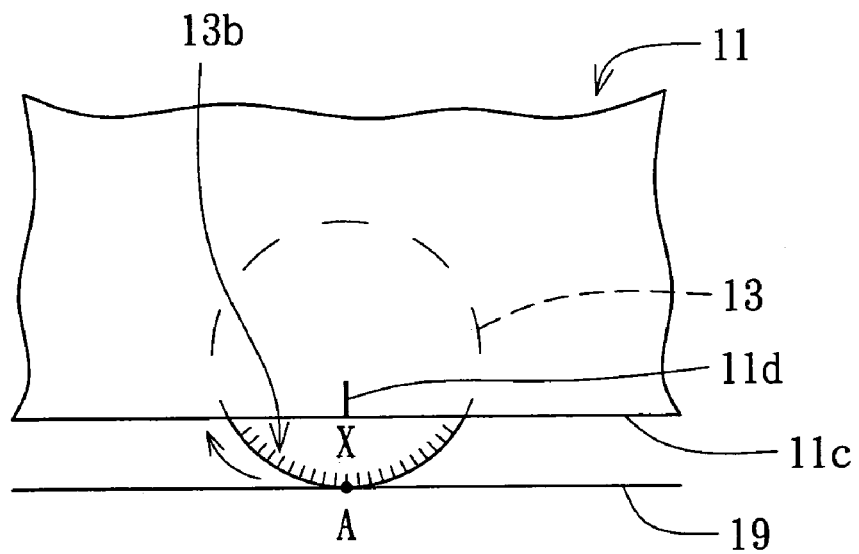
FIG. 6 is a partial enlarged diagram showing the state when a return-to-zero position of a roller in FIG. 3 is aligned with a casing index and the point A when at a second position.

Furthermore, if the decoder 14 neglects the uncompleted rotation of the roller 13, the roller 13 of the present embodiment can be designed to have a length mark. The length mark is like the voice level on the roller 13, and the user can estimate the length value of the uncompleted rotation of the roller 13. As shown in FIG. 6, the casing 11 further has an index 11*d*, and the edge of the roller 13 has a length mark 13*b*. The length mark 13*b* has a return-to-zero position X whose reading is zero. Before the user uses portable electronic device 10 to measure the length, the user can rotate the roller 13 for the return-to-zero position X to be aligned with the index 11*d* and the point A.

Figure 7:
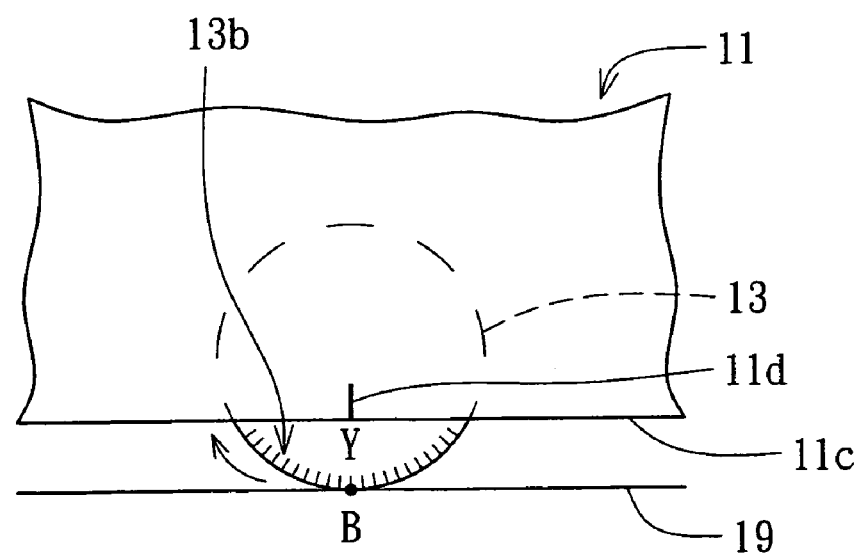
FIG. 7 is a diagram showing the state when an end position of a roller in FIG. 6 is aligned with a casing index and the point B when at a second position.

As shown in FIG. 7, after the user has used the portable electronic device 10 to measure the length, that is, the roller 13 rotates on the surface 19 from the point A to the point B, the index 11*d* is aligned with the point B and with an end position Y on the length mark 13*b*. The end position Y has a measure reading. Meanwhile, the user can obtain the value of the length L according to the length value displayed on the display unit 12 and the estimated measure reading of the length mark 13*b* on the roller 13.

In the present embodiment, when the user rotates the roller 13 of the portable electronic device 10 which works at the voice-adjusting mode, the encoder 14 outputs a first pulse and a second pulse according to the rotation turn of the roller 13 and the direction of rotation. The controller 15 receives the first pulse and the second pulse, and the direction of rotation of the roller 13 can be obtained according to the phases of the first and the second pulses. Besides, the controller 15*c*an impute the amount of rotation from the counts of the first and the second pulses and adjusts the voice of the portable electronic device 10 such as the voice of the speaker 18 for instance.

Any one who is skilled in the technology of the present embodiment of the invention understands that the technology of the present embodiment of the invention is not limited thereto. For example, the display unit 12 can be a liquid crystal display panel (LCD panel), an organic light emitting diode (OLED) display panel, a plasma display panel or an organic electroluminescent device (OELD). Besides, the encoder 14 can be a rotary encoder, and the function switch 27 can be disposed on the casing lateral surface 11*c*. Furthermore, the portable electronic device 10 can be a mobile phone, a personal digital assistant (PDA) or any electronic device with a volume-adjusting roller 13. Despite the portable electronic device 10 of the present embodiment is exemplified by a non-foldable electronic device, the portable electronic device of the present embodiment can be a foldable electronic device or a slide-type electronic device.

In the present embodiment, the portable electronic device 10 can set an input combination of a first portion keys on the keypad 16 as an instruction of activating the voice-adjusting mode and set an input combination of a second portion keys on the keypad 16 as an instruction of activating the length-adjusting mode. Thus, the user can selectively switch the portable electronic device 10 between the voice-adjusting mode and the length-measuring mode via the input combination of the first portion keys and the second portion keys on the keypad 16.

With the design of measuring a length that a roller rotates over a to-be-measured object or plane, the portable electronic device disclosed in the present embodiment displays a length value on a display unit according to the rotation turn of the roller. Thus, not only is the user allowed to measure the length of an object or a plane whenever and wherever needed, the practicality of portable electronic device is also largely enhanced.

Second Embodiment

Figure 8:
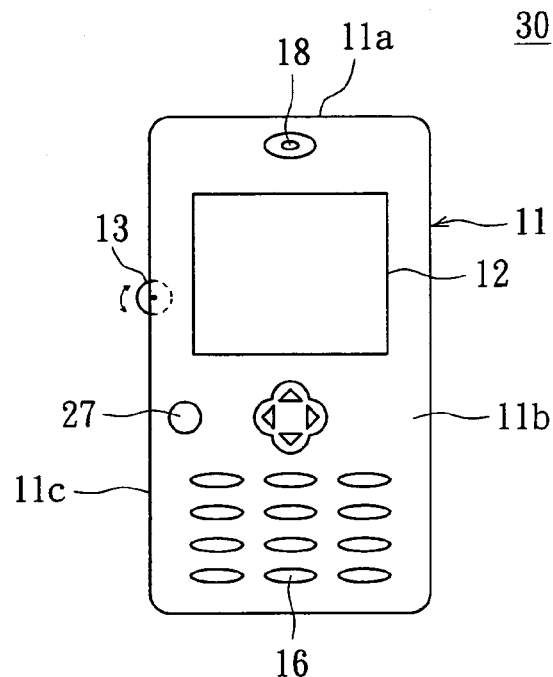
FIG. 8 is a diagram of a portable electronic device according to a second embodiment of the invention.
Figure 9:
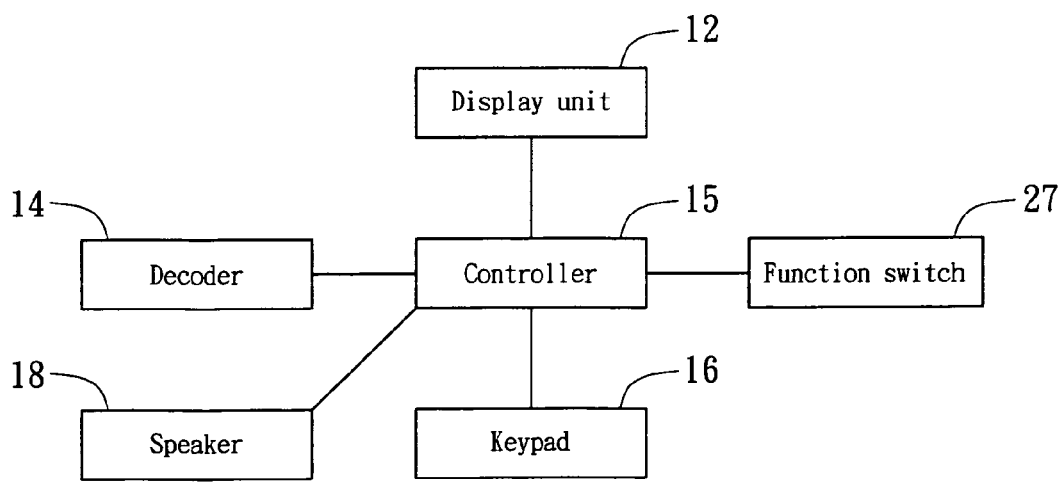
FIG. 9 is a circuit block diagram of a portable electronic device according to a second embodiment of the invention.

Referring to FIGS. 8~9, FIG. 8 is a diagram of a portable electronic device according to a second embodiment of the invention, and FIG. 9 is a circuit block diagram of a portable electronic device according to a second embodiment of the invention. The portable electronic device 30 of the present embodiment differs with the portable electronic device 10 of the first embodiment in that function switch 27 of the portable electronic device 30 enables the user to selectively switch the portable electronic device 30 between the voice-adjusting mode and the length-measuring mode. As for the same components, the same labels are used and their relationships are not repeated here.

In FIGS. 8~9, the function switch 27 is disposed on the casing surface 11*a*. For example, the function switch 27 can be disposed on the casing front surface 11*b* to be electrically connected to the controller 15. The function switch 27 touched to output a switch signal, so that the controller 15 switches the portable electronic device 10 between the voice-adjusting mode and the length-measuring mode.

When portable electronic device 30 works at the voice-adjusting mode, the user can rotate the roller 13 to adjust the voice of the portable electronic device 30. For example, the voice of the speaker 18 is adjusted.

When the portable electronic device 30 works at the length-measuring mode, the user can move the roller 13 to touch a surface with the casing lateral surface 11*c* facing the surface. Next, the user can rotate the roller 13 to measure the length on the surface by moving the portable electronic device 30 with respect to the surface.

Third Embodiment

Figure 10:
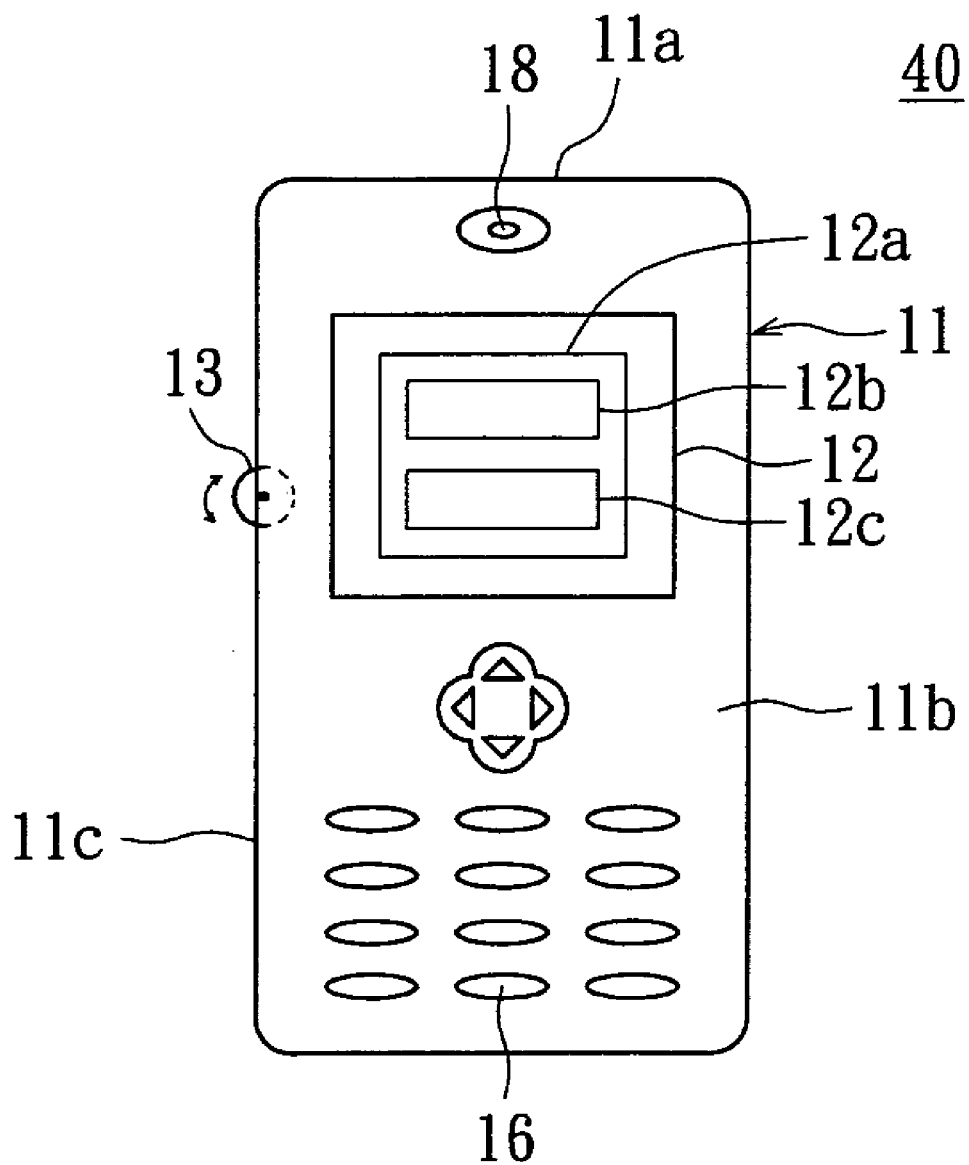
FIG. 10 is diagram of a portable electronic device according to a third embodiment of the invention.

Referring to FIG. 10, a diagram of a portable electronic device a according to a third embodiment of the invention is shown. The portable electronic device 40 of the present embodiment differs with the portable electronic device 10 of the first embodiment in that the display unit 12 has a function menu 12*a* for selectively switching the portable electronic device 40 between the voice-adjusting mode and the length-measuring mode. As for the same components, the same labels are used and their relationships are not repeated here.

In FIG. 10, the function menu 12*a* has a volume-adjusting item 12*b* and a length-measuring item 12*c*. When the user operates to select the volume-adjusting item 12*b* via the keypad 16 or other operating interface, the portable electronic device 10 is switched to the voice-adjusting mode. Meanwhile, the user can rotate the roller 13 to adjust the voice of the portable electronic device 40. For example, the voice of the speaker 18 is adjusted. When the user operates to select the length-measuring item 12*c* via the keypad 16 or other operating interface, the portable electronic device 10 is switched to the length-measuring mode. Meanwhile, the user can move the roller 13 to touch a surface with the casing lateral surface 11*c* facing the surface. Next, the user can rotate the roller 13 to measure the length on the surface by moving the portable electronic device 40 with respect to the surface Any one who is skilled in the technology of the present embodiment of the invention understands that the technology of the present embodiment of the invention is not limited thereto. For example, the display unit 12 can be a touch-control-type display unit, which enables the user to touch and control the volume-adjusting item 12b or the length-measuring item 12c of the display unit 12 with a stylus or a finger to selectively switch the portable electronic device 40 between the voice-adjusting mode and the length-measuring mode.

With the design of measuring a length that a roller rotates over a to-be-measured object or plane, the portable electronic device disclosed in the present embodiment displays a length value on a display unit according to the rotation turn of the roller. Thus, not only is the user allowed to measure the length of an object or a plane whenever and wherever needed, the practicality of portable electronic device is also largely enhanced While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable electronic device selectively working at a voice-adjusting mode and a length-measuring mode, comprising:
   a casing having a casing surface;
   a display unit disposed on the casing surface;
   a roller rotatably disposed on the casing surface with a portion of the roller being exposed outside the casing, wherein when the portable electronic device works at the voice-adjusting mode, the roller is for adjusting the voice of the portable electronic device, and when the portable electronic device works at the length-measuring mode, the roller touching a surface and then rotating on the surface to measure a length;
   an encoder disposed inside the casing for outputting a pulse number according to the rotation turn of the roller when the portable electronic device moves with respect to the surface; and
   a controller disposed inside the casing and electrically connected to the display unit and the encoder, wherein the controller controls the portable electronic device to selectively work at the voice-adjusting mode and the length-measuring mode, the controller receives the pulse number and then determines a length value accordingly, and the controller controls the display unit to display the length value.

2. The portable electronic device according to claim 1, wherein the roller is selectively positioned at a first position and a second position with respect to the casing;
   wherein when the roller is positioned at the first position, the roller works at the voice-adjusting mode;
   wherein when the roller is pressed by the user to touch the surface to be positioned at the second position, the roller works at the length-measuring mode.

3. The portable electronic device according to claim 2, wherein when the roller is moved from the first position to the second position, the encoder triggers a first signal, so that the controller controls the portable electronic device to switch to the length-measuring mode.

4. The portable electronic device according to claim 2, further comprising:
   an elastomer connected to the roller, wherein when the roller leaves the surface, the elastomer forces on the roller from the second position to the first position, and the encoder triggers a second signal, so that the controller controls the portable electronic device to switch to the voice-adjusting mode.

5. The portable electronic device according to claim 1, further comprising:
   a function switch disposed on the casing surface and electrically connected to the controller, wherein the function switch is pressed for outputting a switch signal, so that the controller controls the portable electronic device to switch between the voice-adjusting mode and the length-measuring mode.

6. The portable electronic device according to claim 5, further comprising:
   a keypad disposed on the casing surface and electrically connected to the controller, wherein the keypad is for the user to input and operate.

7. The portable electronic device according to claim 6, wherein the casing surface comprises:
   a casing front surface having the display unit, the function switch and the keypad; and
   a casing lateral surface connected to the casing front surface and having the roller.

8. The portable electronic device according to claim 6, wherein the casing surface comprises:
   a casing front surface having the display unit and the keypad; and
   a casing lateral surface connected to the casing front surface and having the roller and the function switch.

9. The portable electronic device according to claim 1, wherein the controller, which stores the value of the radius of the roller, and a basic pulse number generated by the roller during each rotation, determines the length value according to the pulse number, the radius of the roller and the basic pulse number generated by the roller during each rotation.

10. The portable electronic device according to claim 9, wherein when the pulse number, the radius of the roller, the basic pulse number generated by the roller during each rotation and the length value are respectively equal to K, R, M and D, D is substantially equal to the value of $2\pi RM/K$.

11. The portable electronic device according to claim 1, wherein the casing has an index, the edge of the roller has a length mark, the length mark has a return-to-zero position, the reading of the return-to-zero position is zero, and before the user uses the portable electronic device to measure the length, the user can rotate the roller for the return-to-zero position to be aligned with the index.

12. The portable electronic device according to claim 11, wherein after the user has used the portable electronic device to measure the length, the index is aligned with an end position having a measure reading, and the user knows the length according to the length value and the measure reading.

13. The portable electronic device according to claim 1, wherein the display unit has a function menu, the function menu has a volume-adjusting item and a length-measuring item, and when the user operates to select the volume-adjusting item or the length-measuring item, the portable electronic device is switched to the voice-adjusting mode or the length-measuring mode.

14. A portable electronic device selectively working at a voice-adjusting mode and a length-measuring mode, comprising:
   a casing having a casing surface;
   a display unit disposed on the casing surface; and a roller rotatably disposed on the casing surface with a portion of the roller being exposed outside the casing, wherein the roller is selectively positioned at a first position and a second position with respect to the casing, when the roller is positioned at the first position, the roller works at the voice-adjusting mode for adjusting the voice of the portable electronic device, and when the roller is positioned at the second position, the roller works at the length-measuring mode for touching a surface and then rotating on the surface to measure a length;

wherein the display unit displays a length value of the length.

15. The portable electronic device according to claim 14, further comprising:
   an encoder disposed inside the casing for outputting a pulse number according to the rotation turn of the roller when the portable electronic device moves with respect to the surface; and
   a controller disposed inside the casing and electrically connected to the display unit and the encoder, wherein the controller controls the portable electronic device to selectively work at the voice-adjusting mode and the length-measuring mode, the controller receives the pulse number and then determines the length value accordingly, the controller controls the display unit to display the length value.

16. The portable electronic device according to claim 14, wherein when the roller is moved from the first position to the second position, the encoder triggers a first signal, so that the controller controls the portable electronic device to switch to the length-measuring mode.

17. The portable electronic device according to claim 14, further comprising:
   an elastomer connected to the roller, wherein when the roller leaves the surface, the elastomer forces the roller from the second position to the first position, and the encoder triggers a second signal, so that the controller controls the portable electronic device to switch to the voice-adjusting mode.

18. The portable electronic device according to claim 14, wherein the casing surface comprises:
   a casing front surface having the display unit, the function switch; and
   a casing lateral surface connected to the casing front surface and having the roller.

19. The portable electronic device according to claim 14, wherein the controller, which stores the value of the radius of the roller, a basic pulse number generated by the roller during each rotation, determines the length value according to the pulse number, the radius of the roller and the basic pulse number generated by the roller during each rotation.

* * * * *